Sept. 10, 1968                   E. MIKI                  3,401,321
PHASE CONTROL SYSTEM UTILIZING SINGLE
OR MULTIPLE POLE SLIP Filed March 14, 1966                                  2 Sheets-Sheet 1

INVENTOR.
EIJI MIKI

BY
ATTORNEYS

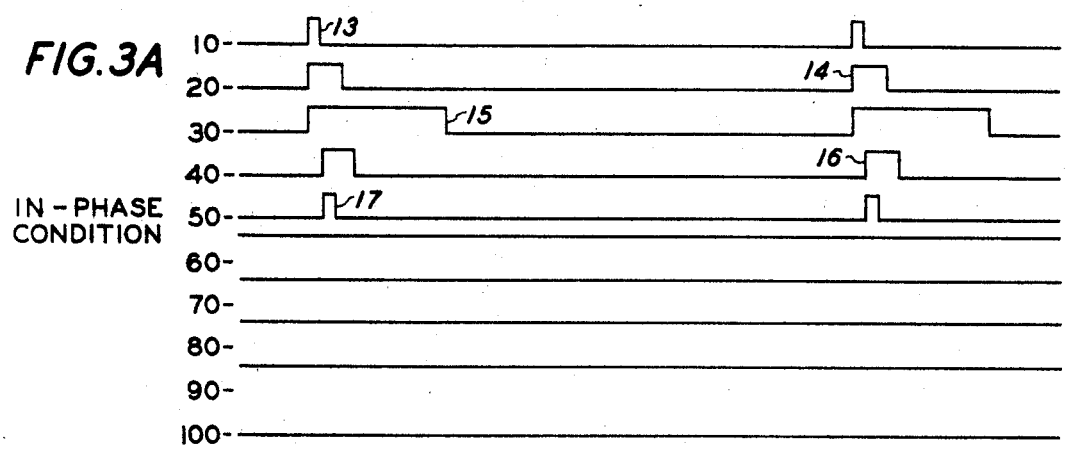
FIG.3A IN-PHASE CONDITION
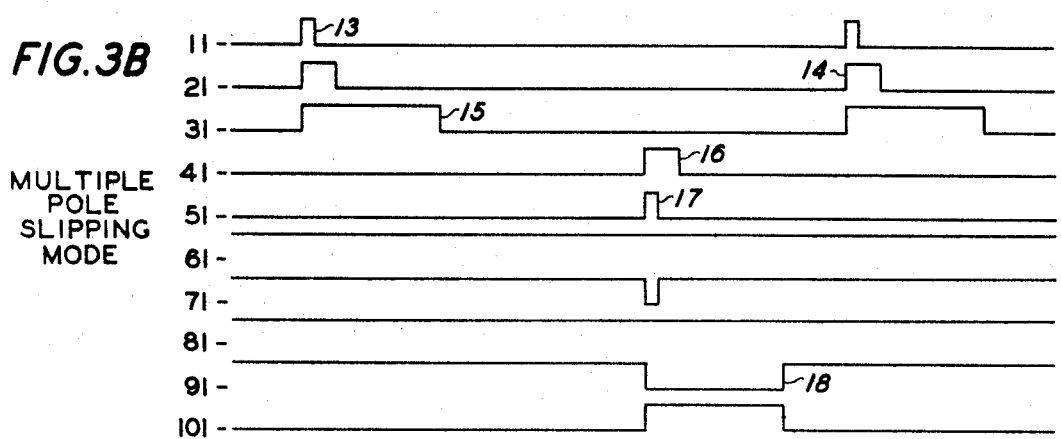
FIG.3B MULTIPLE POLE SLIPPING MODE
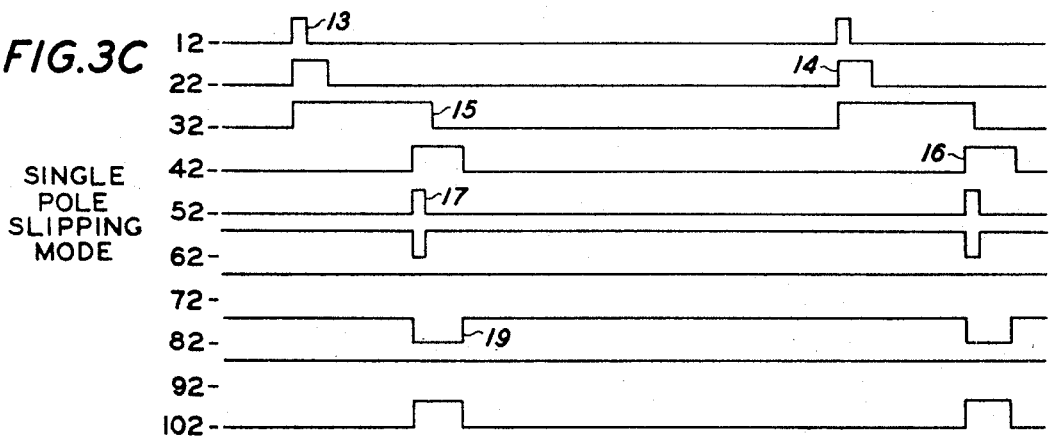
FIG.3C SINGLE POLE SLIPPING MODE
INVENTOR.
EIJI MIKI
ATTORNEYS

United States Patent Office 3,401,321
Patented Sept. 10, 1968

3,401,321
PHASE CONTROL SYSTEM UTILIZING SINGLE OR MULTIPLE POLE SLIP
Eiji Miki, Webster, N.Y., assignor to Xerox Corporation, Rochester, N.Y., a corporation of New York
Filed Mar. 14, 1966, Ser. No. 534,151
8 Claims. (Cl. 318—85)

This invention relates to improved electric circuits for motor control. More specifically, this invention relates to improved electric circuits for controlling the phase between at least two motors.

Very often it is desirable to operate in synchronism two motors which are spacially removed from each other. This synchronous condition is usually sought because the loads on the shafts of such motors must maintain a precise speed and phase relationship with each other.

In an ideal situation, two identical motors will operate synchronously assuming all the factors which dictate a motor's operation are the same for each motor. However, in the practical situation, identity in design is difficult, if not impossible, to accomplish. The differences between individual component characteristics for each motor's control circuits also contribute to altering a particular motor's operation. The variances in component characteristics can exist in new components while also occurring during the aging and use of components. Various parameters such as line voltage may fluctuate randomly adding to the effect of other factors which alter the operation of the motor from the ideal situation.

In view of all these changing factors, when it is necessary to insure synchronous operation of two motors, a link must be established between the motors in order to provide some indication of when and by what amount one motor is out of synchronism or out of phase with the other motor. However, this indication is not sufficient by itself for the link must also react to this signal of phase difference to provide a compensating effect on one of the motors. The complexity of the link and the physical distance usually between such motors necessitate the requirement that the connecting link be of an electronic nature. Such a link is called a synchronizing circuit. This circuit is generally characterized by two inputs, each of which receive a synchronizing or sync signal from a respective motor which represents the condition of phase of the motor. The synchronizing circuit also has an output which provides a compensating signal to the control circuit of one of the motors to correct for an out of phase condition determined by the synchronizing circuit after a comparison of the phase of the sync signals. The sync signal from the motor distant from the sync circuit can be translated to the sync circuit either by direct electrical connection or by electromagnetic transmission. The mode of translation is usually dependent on the distance between the motors as well as the use to which the motors are put.

An exemplary application of two motors which must operate in phase is in a facsimile transmission system. In a typical system there is usually a minimum of two stations, a transmitting or scanner station and a receiving or recorder station. At each station there may be a motor which performs a specified task depending on which station is involved. At the transmitting station, the motor may drive a conventional mechanical scanner which systematically scans an original, for example, a printed document. At the receiver station, a motor may drive a mechanical recorder, for example, and a paper conveyor in such a manner to allow the recorder to print a facsimile of the original document on the paper. It is evident from the review of tasks to which the motors at both stations are put that synchronism in the operation of the motors is very desirable. If the motors become out of phase in their operation, the recorded facsimile of the original document at the receiver station will be distorted.

In addition to the aforementioned considerations, in many facsimile transmission systems leased telephone lines may constitute the electrical link between the transmitting and receiving stations and any time spent, for example, to synchronize the motors at these stations before a document facsimile is transmitted adds to the cost of transmission. Therefore, with time at a premium it is very desirable to achieve synchronism between the stations' motor as quickly as possible.

Generally, the operational characteristics of alternating current reluctance synchronous motors make such motors highly desirable for use in facsimile systems. With this type of motor the rotor rotates in synchronism with the line voltage which generates a rotating electro-magnetic field. The poles of the rotor can therefore have only a limited number of discrete positions relative to the rotating electro-magnetic field. Prior art systems have been directed to a synchronizing concept of interrupting power to one motor for such a period as to allow the position of the rotor to be changed by one pole with relation to the rotating electro-magnetic field. This process was repeated until synchronization was obtained. However, in the case of a low revolution per minute motor used for low speed operation, the time required by this prior art technique to achieve an in phase condition is excessive.

Therefore, an object of this invention is to provide an improved circuit for selectively changing the phase of a motor to a desired phase.

Another object of the invention is to provide an improved circuit to achieve proper phasing between a motor and a desired phase in a minimum of time.

Another object of the invention is to provide an improved circuit for determining the phase between two signals.

These and other objects of the invention are accomplished by means of a phase comparator circuit which determines the phase difference between two motors and compares this phase difference with a standard pulse. The result of this comparison establishes whether or not the degree of the phase difference requires that the rotor of the motor to be controlled be slipped for a single pole or for a multiplicity of poles in order to phase synchronize the operation of this motor in a minimum of time.

For a better understanding of the invention, as well as other objects and features thereof, reference may be made to the following description of the invention to be read in connection with the accompanying drawings, wherein.

Figure 2:
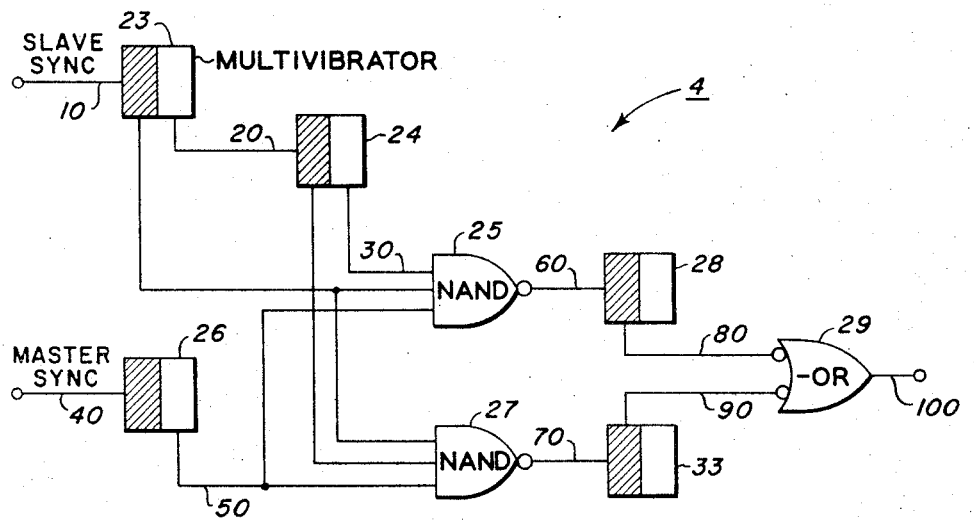
FIGURE 2 shows a schematic diagram of the present invention.

FIGURES 3A, 3B, and 3C illustrate waveforms which are helpful in understanding the operation of the circuit of FIGURE 2.

Figure 1:
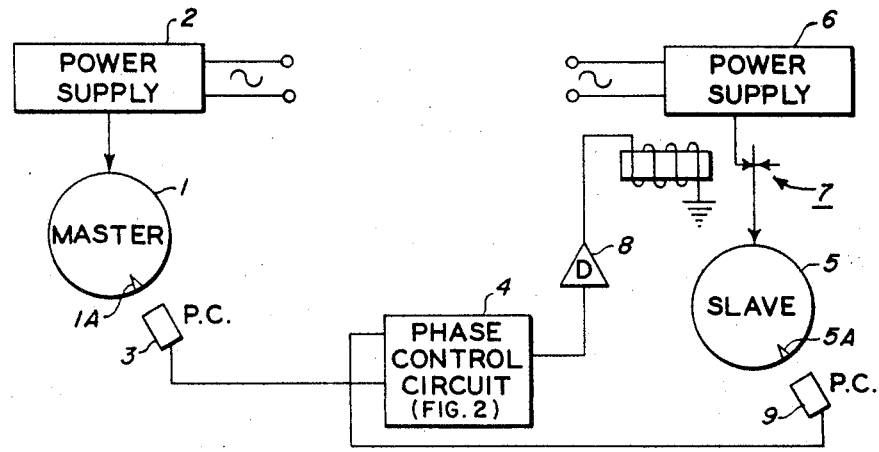
FIGURE 1 is a block diagram showing the overall system in which the present invention may be incorporated.

In FIGURE 1, a system in which the disclosed invention may be used is illustrated. This system includes a master motor 1 which is supplied power from power supply 2. A synchronizing signal, referred to as the master sync, is generated, for example, by photocell 3 which detects a bench mark 1A which is located suitably on the master motor. This master sync pulse is connected to one input of phase control circuit 4 which also receives a synchronizing signal from photocell 9, which detects a bench mark 5A on slave motor 5. Phase control circuit 4 then compares the phase difference between the master sync and the slave sync and controls a relay driver 8, accordingly, which selectively opens relay 7, the contacts of which are normally closed to provide the necessary energy to slave motor 5 from power supply 6. Depending on the phase difference between master sync and slave sync, relay 7 will disconnect power supply 6 from slave motor 5 for a predetermined amount of time depending on this phase difference. If the phase difference is small, this time period of interruption of power to slave motor 5 may be such so as to cause slave motor 5 to slip a single pole for every interruption. However, if the phase difference is great, the relay may be energized for a time period of such duration as to enable slave motor 5 to slip more than one pole, i.e., a specified number of poles, for each interruption of power. Relay driver 8 is of conventional design, for example, as set out in Harmon-Kardon's catalog, "Digital Logic," No. 515. Phase control circuit 4 is shown in detail in FIGURE 2.

In referring to the operation of the circuit of FIGURE 2, it is essential that some fundamentals be stated. The multivibrators used in this circuit are of the monostable type and are in their reset condition before the operation of the circuit commences. It is understood that these multivibrators are set exclusively by positive pulses. A positive pulse is defined as a change in signal from one voltage level to a more positive voltage level. As shown in this schematic, the cross hatched section of the multivabrators indicates the set side of this component. The other section of the schematic symbol indicates the reset side of this component. The NAND gates shown in the circuit of FIGURE 2 are of a conventional logic design which provide a high level output for any combination of low and high level inputs except when all inputs are at a high level at which time a low level output will be provided. The negative OR gate shown in the circuit of FIGURE 2 is also of conventional logic design permitting a low level output only upon the coincidence of two high level inputs. For any other combination of low and high level inputs, a high level output will be provided. An example of the design of the aforementioned multivibrators and logic gates used in the circuit of FIGURE 2 can be found in Harmon-Kardon's publication, "Digital Logic," Catalog No. 515. However, it should be understood that these are examples only of possible designs for these components and that any conventional design may be used.

Referring now in detail to the circuit of FIGURE 2 and its operation with reference also to the waveforms of FIGURES 3A, 3B, and 3C, it should be noted that the reference numerals designating connecting conductors between components correspond to the particular waveforms in FIGURES 3A–C, ignoring the unit digit which corresponds to the particular mode of operation during which these waveforms occur. The particular mode of operation may be one of three: (1) in-phase mode, (2) multiple pole slipping mode, and (3) single pole slipping mode. For the purposes of providing a clear explanation of the circuit, the in-phase mode and multiple pole slipping mode will be examined in detail. From this examination, the operation of the circuit in the single pole slipping mode will be easily understood without explanation.

In the in-phase mode of operation, slave and master sync pulses as shown in waveforms 10 and 40, respectively, in FIGURE 3A, arrive simultaneously at the two inputs of phase control circuit 4. It is parenthetically noted that the term, "simultaneous" as used here will be qualified hereinafter. These sync pulses set multivibrators 23 and 26, respectively, the outputs of which are shown in waveforms 20 and 50, respectively, in FIGURE 3A. The positive pulse from the reset side of multivibrator 23 sets multivibrator 24 which provides from its reset side a positive pulse as shown in waveform 30 in FIG. 3A which serves as an input to NAND gate 25. This pulse will hereinafter be referred to as the standard pulse. The other two inputs to NAND gate 25 are provided from the set side of multivibrator 23 and the reset side of multivibrator 26. NAND gate 27 also has three inputs, one from the set side of multivibrator 24, another from the reset side of multivibrator 23, and a third from the set side of multivibrator 26.

It is understood that the outputs from NAND gates 25 and 27 are at a high level before operation of the circuit commences. Only when there is a coincidence of high level signals on all the inputs of these gates will there be a change in voltage level at their outputs.

In view of this fact and the fact that one of the inputs is from the set side of multivibrator 23 which enables this input during the period between slave sync pulses, NAND gate 25 can be considered as a detection means for the coincidence of the standard pulse and the master sync pulse in the absence of the slave sync pulse. Analogously, NAND gate 27 can be considered as a detector in the master sync pulse in the absence of both the standard and slave sync pulses. Therefore, with regards to NAND gate 25, when the standard pulse and the master sync pulse are present simultaneously at their respective inputs to this gate in the absence of the slave pulse at the third input, the voltage level at the output of this gate will change from its normally high level to a low level. Upon the expiration of either the standard pulse or the master sync pulse, the output from NAND gate 25 will return to its normally high level creating a positive pulse which will set multivibrator 28 which is connected directly to the output of this gate. It should be noted at this point that reference to master and sync pulses does not mean exclusively the actual sync pulses per se but also includes those pulses generated by multivibrators 23 and 26, as shown in waveforms 20 and 50 by the reference numeral 14 and 17, respectively.

Applying now the same reasoning as was applied to NAND gate 25 to NAND gate 27, it is seen that when the master sync pulse is present at one input of this gate coincidentally with the lack or absence of the standard pulse and the slave sync pulse, the voltage level at the output of this gate will change from its normally high level to a lower level. Upon the expiration of the master sync pulse, or the appearance of either the standard pulse or the slave sync pulse on their respective inputs, the output from NAND gate 27 will then return to its normally high level, thereby generating a positive pulse which will set multivibrator 33 which is directly connected to the output of this gate. The outputs from multivibrators 28 and 33 will be explained in more detail hereinafter as concerning the multiple pole slipping mode of operation. In the situation where the master and slave sync pulses are in phase, it is clearly seen that the outputs from NAND gates 25 and 27 will not be altered, thereby permitting multivibrators 28 and 33, respectively, to remain in their reset condition. This follows from the fact that NAND gate 25 will detect the coincidence of the master and slave sync pulses as well as the standard pulse. In regard to NAND gate 27, the presence of the slave and master sync pulses coincident with the standard pulse will also be detected and therefore no change in its output will ensue.

In summary, then, of the in-phase mode of operation, it is clearly seen that when there is no phase difference between the master and slave sync pulses, the outputs from NAND gates 25 and 27 remain unaltered and the condition of flip-flops 28 and 33 also are unchanged thereby permitting the contacts of relay 7 to remain closed and the energy from power supply 6 will flow uninterrupted to slave motor 5 permitting that motor to continue operation in phase with master motor 1.

Reference will now be made to the situation in which a gross phase difference exists between the operation of master motor 1 and slave motor 5. In such a situation, NAND gates 25 and 27 will perform a logical operation to determine the amount of phase difference which exists between the slave and master sync pulses and, if this phase difference exceeds a certain amount, for example, the duration of the standard pulse, the relay 7 will be opened for a period of time necessary to permit the rotor of slave motor 5 to slip a specified plurality of poles before power to slave motor 5 is reinstated. This is seen from considering the operation of NAND gates 25 and 27. NAND gate 25, which can be related to the single pole slipping mode, will receive inputs very similar to those received when the master and slave sync pulses were in phase, with the exception that the standard pulse will not be coincident with the master sync pulse. Turning now to the inputs of NAND gate 27, related to the multiple pole slipping mode, the master sync pulse will be coincident at the input to this gate with the absence of both the slave sync pulse and the standard pulse. When this condition is present, as was described earlier, the output of NAND gate 27 will change from its normally high level to a lower level. Because of the duration of the pulse from the reset side of multivibrator 26 which represents the master sync pulse, this condition of low level signal at the output of NAND gate 27 will be brief and terminated by a positive pulse at the moment of expiration of the pulse representative of the master sync pulse at one input of NAND gate 27. This positive pulse as seen in waveform 71 in FIG. 3B, at the output of NAND gate 27 sets multivibrator 33 which in turn provides pulse 18 in waveform 91 of a specified width to negative OR gate 29 which passes this pulse to driver 8, as described with reference to FIGURE 1. Upon receipt of the pulse from negative OR gate 29, driver 8 will be activated to energize relay 7 thereby opening the contacts of this relay to interrupt power from supply 6 to slave motor 5 for a time period substantially corresponding to the width of the pulse generated by multivibrator 33 which is of a predetermined duration in order to permit slave motor 5 to slip a plurality of poles during the interruption of power thereto. In view of the desired result of this power interruption, it is evident that the width of this pulse is a function of motor inertia, damping, and other mechanical factors, as well as the number of poles desired to be slipped in this mode and must be determined experimentally. It has been found for a four pole 60 r.p.m. motor that three poles can be efficiently slipped in this mode of operation with a 30 to 1 gear ratio between motor and load.

It should be understood that the time constants in the multivibrators of the circuit of FIG. 2 could be made variable in order to alter the outputs of such components to adapt the circuit to new loads or motors, for example, or to alter certain pulse widths to obtain the maximum efficiency of such a circuit.

As was noted previously, a detailed explanation of the operation of the circuit of FIGURE 2 in the single pole slipping mode is unnecessary after the above discussion of the multiple pole slipping mode of operation. The waveforms of FIG. 3C are compatible with this mode of operation wherein pulse 19 in waveform 82 energizes relay driver 8 for power interruption.

It should be understood that no attempt has been made in the waveform diagrams of FIGS. 3A–C to represent the individual pulses exactly in regards to amplitude, phase, and width. Reliance on these waveforms illustrations is made for comparison purposes in the explanation of the operation of the invention.

It was stated previously that in the in-phase mode of operation the slave and master sync pulses arrive at their respective multivibrators simultaneously. The term "simultaneously" must be construed in this context to mean that the pulse 17 of waveform 50 in FIGURE 3A must fall within pulse 14 of waveform 20 which is the output of multivibrator 23. In order to achieve this condition for the in-phase mode, the relative positions of the two sync signal pick-up points on the two motors 1 and 5 must be adjusted accordingly. In this manner, the leading edge of pulse 17 of waveform 50 will be generated after the generation of the leading edge of pulse 14 of waveform 20, so that there is no danger of moving to the outside of the leading edge of pulse 14 before the slave motor 5 is stabilized.

Again referring to the in-phase mode of operation and the waveforms of FIGURE 3A, it must be noted that the width of pulse 17 in waveform 50, which is the output from multivibrator 26, is not critical as long as it is very narrow compared with the width of pulse 14 in waveform 20 from the output of multivibrator 23. A typical width which may be used is 1/30 of the width of the pulse 14 of waveform 20. The width of pulse 14 in waveform 20 should not be wider than half a cycle of the line frequency driving the motors so that there is only one stable motor position for the master sync pulse 16 in waveform 40. However, this width of pulse 14 should not be too small since such a condition would increase the chance of missing coincidence with pulse 17 of waveform 50 in the in-phase mode.

In considering the multiple pole slipping mode of operation and the waveforms of FIGURE 3B, it is of interest to point out that the width of pulse 15 in waveform 31 determines how far apart in phase the master and slave sync pulses must be before the circuit switches to the multiple pole slipping mode. This pulse should be narrow in order to take advantage of this multiple pole slipping mode, but yet wide enough so that pulse 17 in waveform 51 does not fall outside this pulse after the final multiple pole slipping has been effected. This is made clear by reference to FIGURE 3B and considering that after the first multiple pole slipping operation has been completed, pulses 16 and 17 in waveforms 41 and 51, respectively, come closer to falling within the width of pulse 15 in waveform 31. Therefore, assuming the worst out of phase condition, two interruptions of the power to slave motor 5 for the multiple pole slipping mode may place the pulses 16 and 17 just outside of the pulse 15. Therefore, it is seen that the width of pulse 15 is a function of the number of poles slipped at one time to insure that the final multiple pole slipping operation causes pulses 16 and 17 to fall within the edges of pulse 15.

Reviewing the operation of NAND gates 25 and 27, it is seen that both NAND gates compare actually the difference in phase with a standard pulse of a specified width, viz., pulse 15. If the master and sync pulses are in phase, no problem exists, and the outputs from the NAND gates remain unaltered. However, if NAND gate 25 detects the presence of the master sync pulse at the same time it detects the presence of the standard pulse in the absence of slave sync pulse, the condition exists where single pole slipping is desired to bring slave motor 5 into phase. Accordingly, a multivibrator is set to provide a pulse to the relay driver 8 which will interrupt the power to slave motor 5 for a duration permitting the slippage of one pole by the rotor of slave motor 5. On the other hand, if NAND gate 27 detects the presence of a master sync pulse in the absence of the slave sync pulse and the standard pulse, the condition exists such that the amount of mis-synchronization is so gross that multiple pole slipping in slave motor 5 is most desirable to achieve in-phase condition as quickly as possible. Therefore, a suitable pulse is generated to interrupt power to slave motor 5 thereby permitting this amount of slippage by this motor. From this review it is clear that the outputs from the NAND gates are mutually exclusive.

In summary, therefore, it is seen that the present invention provides a control circuit for determining the amount of phase difference between two motor sync pulses and acting on this difference to effect an interruption in power to a slave motor for a duration to facilitate either slipping multiple poles if gross adjustment is needed, or slipping one pole if only a vernier adjustment is required.

While the invention has been described with reference to the circuit disclosed herein, it is not confined to the details set forth since it is apparent that certain electrical equivalent components may be substituted for the components of the preferred circuit without departing from the scope of the invention. Thus, for example, the multivibrators and gates may be replaced with other combinations of logic components to provide substantially the same logic functions obtained by those shown in FIGURE 2. Therefore, the monostable multivibrators may be replaced by bistable multivibrators which are selectively reset by appropriate pulses from a clock generator.

Also, relay 7 may also take the form of any conventional type of electronic relay.

Another modification compatible with the present inventive concept is to utilize the mutually exclusive pulses from NAND gates 25 and 27 to actuate variable frequency generators or variable amplitude pulse generators which could provide two signals either different in frequency or different in amplitude which would be indicative of two ranges of phase difference to energize a relay to interrupt power to slave motor 5 accordingly.

Also, although the phase comparator circuit of FIG. 2 is described in a motor synchronizing system, it will be apparent to those skilled in the art that this phase comparator circuit has other useful applications.

The applicant's intention, therefore, is to cover such modifications or changes as may come within the scope of the invention defined by the following claims.

What is claimed is:

1. A control circuit for selectively energizing a relay to interrupt power to an alternating current synchronous reluctance motor to permit selective slippage of the rotor of said motor by an amount indicative of the phase difference between said motor and a desired phase, said control circuit comprising:
   (a) first means for generating a first pulse indicative of a desired phase;
   (b) second means having an output terminal for generating a second pulse indicative of the phase of the motor to be controlled;
   (c) third means coupled to said output terminal and response to said second pulse for generating a third pulse of a predetermined duration;
   (d) logic means coupled to said first, second, and third generating means to detect a phase difference between said first and second pulses and to compare said difference with said third pulse,
   (e) means coupled to said logic means for generating at least a first or second control signal corresponding to a first or second out of phase relationship between said first and second pulses.

2. The circuit of claim 1 wherein said first and second control signals have unequal, predetermined durations,
   (a) said first control signal having a duration substantially equal to a period of power interruption to said motor necessary to permit the rotor of said motor to slip one pole; and
   (b) said second control signal having a duration substantially equal to a period of power interruption to said motor necessary to permit the rotor of said motor to slip a plurality of poles.

3. The circuit of claim 2 wherein:
   said logic means includes at least two logic gates each having input signals representative of said first, second, and third pulses.

4. In a system for synchronizing the operation of a motor with that of a second motor having a desired phase, the combination comprising:
   (a) an alternating current synchronous reluctance motor;
   (b) energy means to drive said reluctance motor;
   (c) relay means for selectively connecting said energy means to said reluctance motor;
   (d) first means for developing a first signal representative of the desired phase;
   (e) second means for developing a second signal representative of the phase of said reluctance motor;
   (f) logic means for determining the amount of phase difference between said first and second signals and for generating an output signal having at least either of two widths each indicative of at least two predetermined ranges of phase difference between said first and second signals; and,
   (g) means to apply said output signal to said relay means,
      whereby the power to said reluctance motor is interrupted for an interval substantially corresponding to the duration of said output signal.

5. The combination recited in claim 4 wherein said logic means includes:
   (a) at least two logic gates each having inputs coupled to said first and second developing means, each of said gates having an output terminal;
   (b) at least a first and second pulse means each having an input coupled respectively to one of said output terminals and responsive to the respective outputs from said logic gates to generate mutually exclusive first and second pulses, respectively, having unlike durations.

6. The combination of claim 5 wherein:
   (a) said first pulse has a duration substantially equal to a period of power interruption to said reluctance motor necessary to permit the rotor of said reluctance motor to slip one pole; and
   (b) said second pulse has a duration substantially equal to a period of power interruption to said reluctance motor necessary to permit the rotor of said reluctance motor to slip a plurality of poles.

7. A control circuit for producing an output signal indicative of the phase difference between two signals comprising:
   (a) means for producing a first signal;
   (b) means for producing a second signal;
   (c) means responsive to said second signal to produce a third signal of a predetermined width;
   (d) logic means for comparing the phase difference between said first and second signals with the width of said third signal and for generating an output signal having either of two widths each indicative of at least two ranges of phase difference between said first and second signals.

8. A control circuit for producing an output signal indicative of the phase difference between two input signals, comprising:
   (a) first means responsive to an input signal for generating a first signal;
   (b) second means responsive to another input signal for generating a second signal;
   (c) third means coupled to said first means and responsive to said first signal for generating a third signal of a predetermined duration;
   (d) first logic means for comparing the phase difference between said first and second signals with said third signal and for generating a first output pulse when said phase difference does not exceed the duration of said third signal;
   (e) second logic means for comparing the phase difference between said first and second signals with said third signal and for generating a second output pulse when said phase difference exceeds the duration of said third signal;
   (f) first pulse means responsive to said first output pulse to generate pulse indicative of a first range of phase differences between said first and second signals; and
   (g) second pulse means responsive to said second output pulse to generate a pulse indicative of a second range of phase differences between said first and second signals.

References Cited

UNITED STATES PATENTS 3,288,923 11/1966 Arimura et al. ____ 318—175 X
3,340,951 9/1967 Vitt _____ 318—314 X ORIS L. RADER, *Primary Examiner.*

B. A. COOPER, *Assistant Examiner.*